United States Patent [19]
Chien

[11] Patent Number: 5,623,124
[45] Date of Patent: Apr. 22, 1997

[54] WALL SWITCH HOUSING

[76] Inventor: Chi-Hua Chien, P.O. Box 1750, Taichung, Taiwan

[21] Appl. No.: 411,086

[22] Filed: Mar. 27, 1995

[51] Int. Cl.$^6$ ...................................................... H01H 9/02
[52] U.S. Cl. .............................. 174/53; 174/50; 220/3.8; 403/105; 24/3.11
[58] Field of Search .................. 174/53, 63, 57, 174/58, 17 R, 48, 50; 220/3.8, 3.92, 3.94, 4.02; 403/298, 105; 24/3.11, 3.12, 3.1

[56] References Cited

U.S. PATENT DOCUMENTS 5,221,814  6/1993  Colbaugh et al. .................... 220/3.6

Primary Examiner—Kristine L. Kincaid
Assistant Examiner—Dhiru R. Patel
Attorney, Agent, or Firm—Charles E. Baxley, Esq.

[57] ABSTRACT

A wall switch housing include a wiring box, a predetermined number of resilient pieces, a predetermined number of connection nails, and a cover plate. The wiring box is provided therein with a plurality of locating projections for holding securely the resilient pieces. The cover plate is provided with a plurality of retaining holes corresponding in location to the resilient pieces and engageable with the connection nails for locating securely the cover plate.

3 Claims, 5 Drawing Sheets

WALL SWITCH HOUSING

FIELD OF THE INVENTION

The present invention relates generally to a housing for electrical switch, and more particularly to a housing for wall switch.

BACKGROUND OF THE INVENTION

The conventional wall switch is fastened to a wall by a plurality of screws and is therefore defective in design in that the screws must be fastened tediously one by one, and that the screws must be unfastened one after another so as to facilitate the repair work to be done when the switch is out of order.

SUMMARY OF THE INVENTION

It is therefore the primary objective of the present invention to provide a housing for wall switch, which comprises retaining means capable of holding securely the component parts of the wall switch.

The foregoing objective of the present invention is attained by a wall switch housing which comprises a wiring box, a predetermined number of resilient pieces, a predetermined number of connection nails, and a cover plate. The wiring box is provided therein with a plurality of locating projections for holding securely the resilient pieces. The cover plate is provided with a plurality of retaining holes corresponding in location to the resilient pieces and engageable with the connection nails for locating securely the cover plate.

The foregoing objective, features and advantages of the present invention will be more readily understood upon a thoughtful deliberation of the following detailed description of the embodiments of the present invention in conjunction with the accompanying drawings.

DETAILED DESCRIPTION OF THE EMBODIMENTS

Figure 1:
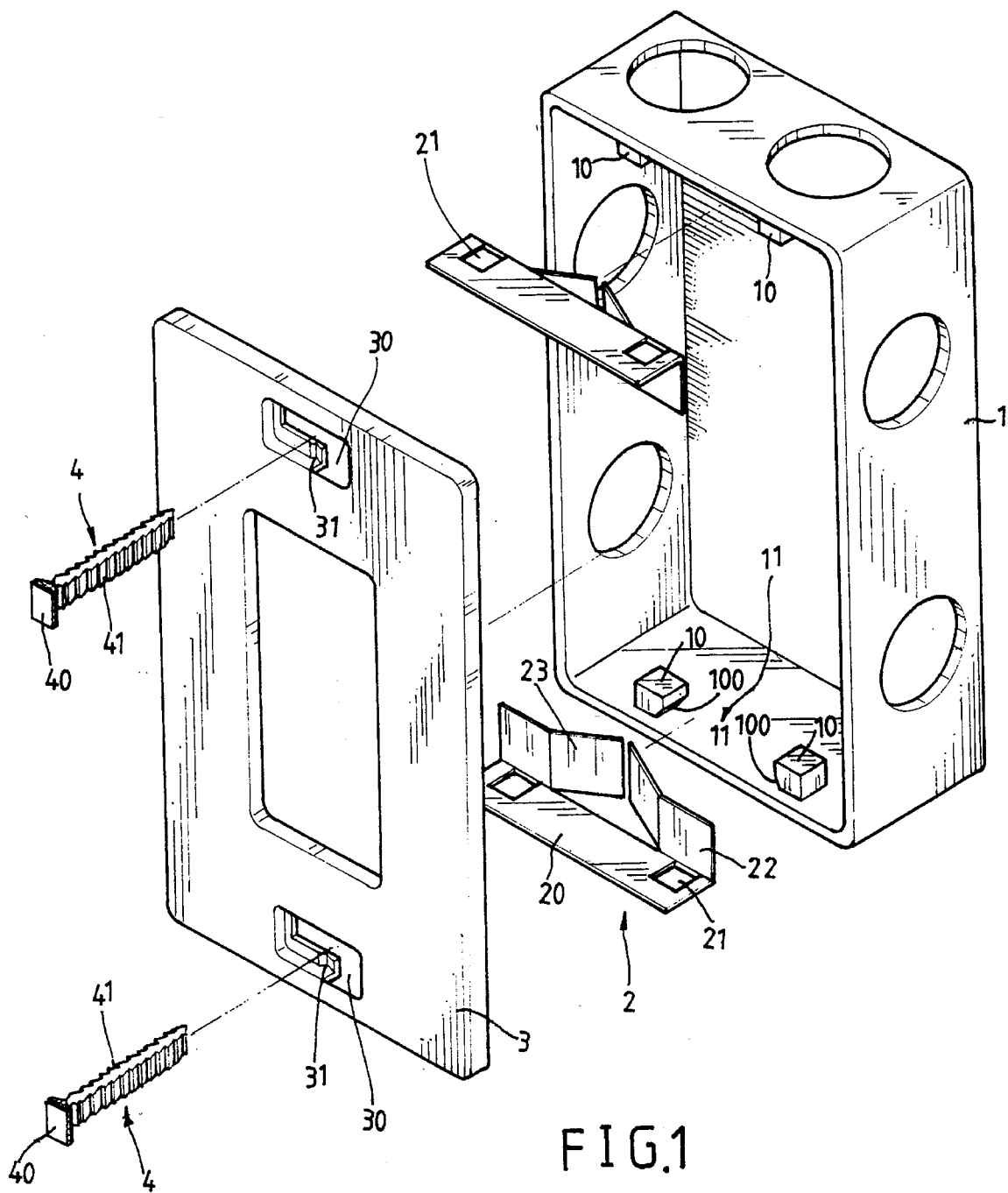
FIG. 1 shows an exploded view of a first preferred embodiment of the present invention.
Figure 2:
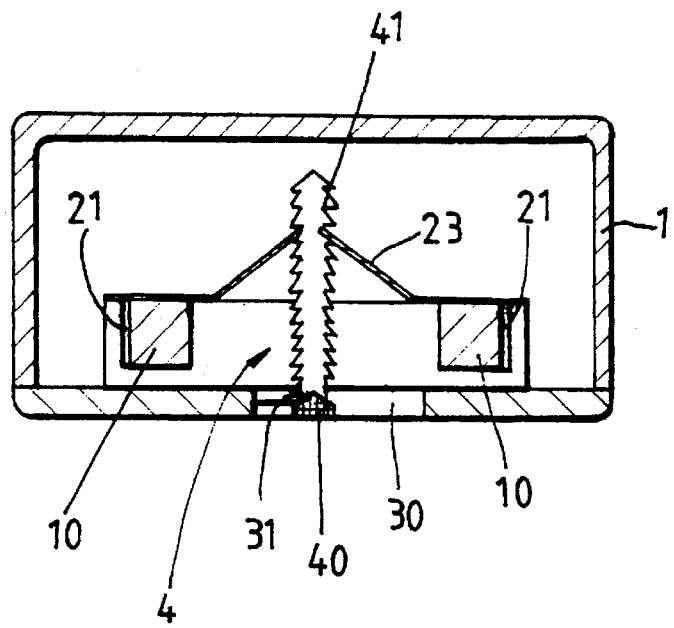
FIG. 2 shows a partial sectional view of the first preferred embodiment in combination according to the present invention.
Figure 3:
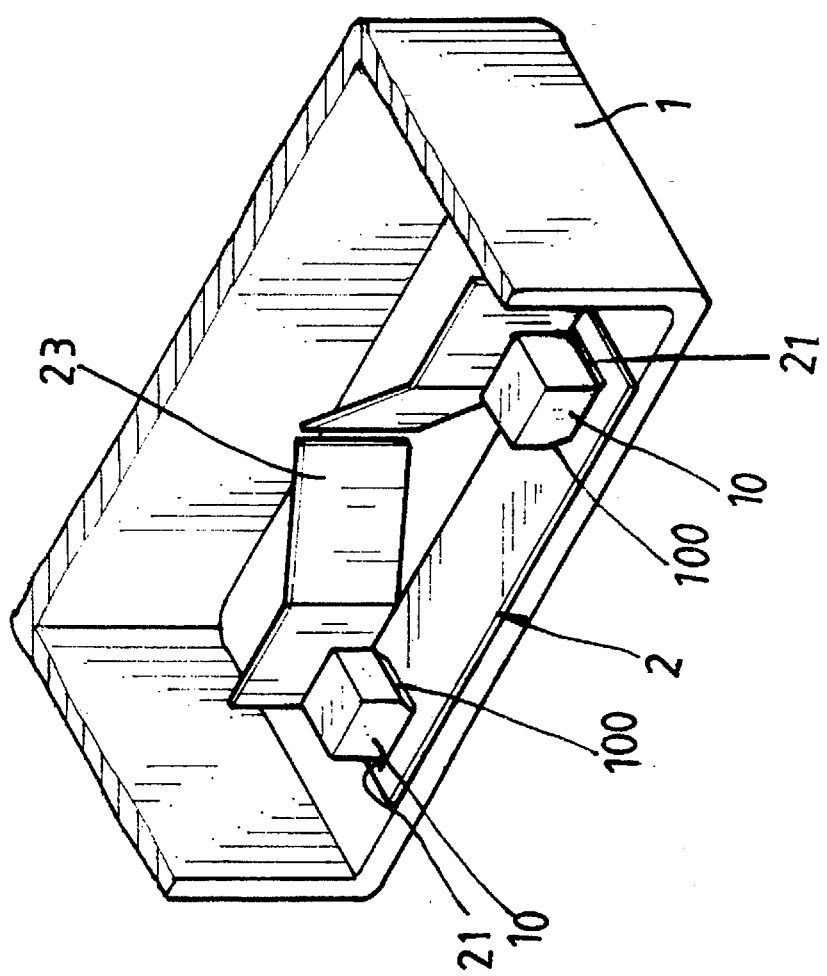
FIG. 3 shows a partial perspective view of the first preferred embodiment in combination according to the present invention.

As shown in FIGS. 1–3, a wall switch housing of the first preferred embodiment of the present invention comprises a wiring box 1, a predetermined number of resilient pieces 2, a cover plate 3, and a predetermined number of connection nails 4.

The wiring box 1 is provided therein with a predetermined number of locating projections 10, which are provided respectively in one side thereof with a recess 100. The locating projections 10 are separated by a predetermined interval 11.

The resilient pieces 2 are provided respectively in a horizontal surface 20 with a locating hole 21 corresponding in location to and engageable with the locating projection 10 of the wiring box 1. The resilient pieces 2 are provided respectively in a vertical surface 22 thereof with a retaining portion 23 corresponding in location to the interval 11.

Each locating projection 10 of the wiring box 1 is engageable with the corresponding locating hole 21 of the resilient piece 2. As the resilient piece 2 is moved to the lower edge of the locating projection 10, one side of the locating hole 21 is received in the recess 100 so as to ensure that each resilient piece 2 is engaged securely with the locating projection 10.

The cover plate 3 is fastened with the wiring box 1 and is provided with two retaining holes 30 corresponding in location to the retaining portion 23 of the resilient piece 2. The retaining hole 30 of the cover plate 3 is in communication with the interval 11. Each retaining hole 30 is provided with two V-shaped surfaces 31 corresponding in location to each other.

The connection nails 4 are provided respectively with a tapered end 40 corresponding in location to the V-shaped surface 31 of the cover plate 3 and are further provided respectively with a serrated portion 41. The nails 4 are received respectively in the retaining hole 30 of the cover plate 3 such that the serrated portion 41 is retained by the retaining portion 23 of the resilient piece 2, and that the V-shaped surfaces 31 are pressed against by the tapered end 40.

Figure 4:
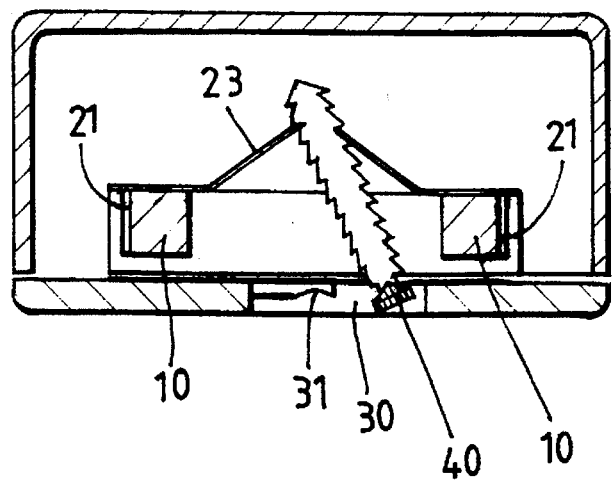
FIG. 4 shows a partial sectional view of the first preferred embodiment of the present invention.

The electrical switch can be located securely in the wall switch housing of the present invention by means of the connection nails 4 without the use of any fastening means. It is therefore readily apparent that the present invention has an inherent advantage over the prior art. In addition, the cover plate 3 of the present invention can be disengaged easily with the connection nails 4 in view of the fact that the retaining portion 23 of each resilient piece 2 is movable, and that the retaining hole 31 of the cover plate 3 is provided at one end thereof with a greater space, and further that the tapered end 40 of the connection nail 4 is no longer engaged with the V-shaped surfaces 31 of the retaining hole 30 when the connection nail 4 is pushed toward the greater space of the retaining hole 31 of the cover plate 3, as illustrated in FIG. 4 in conjunction with FIG. 1.

Figure 5:
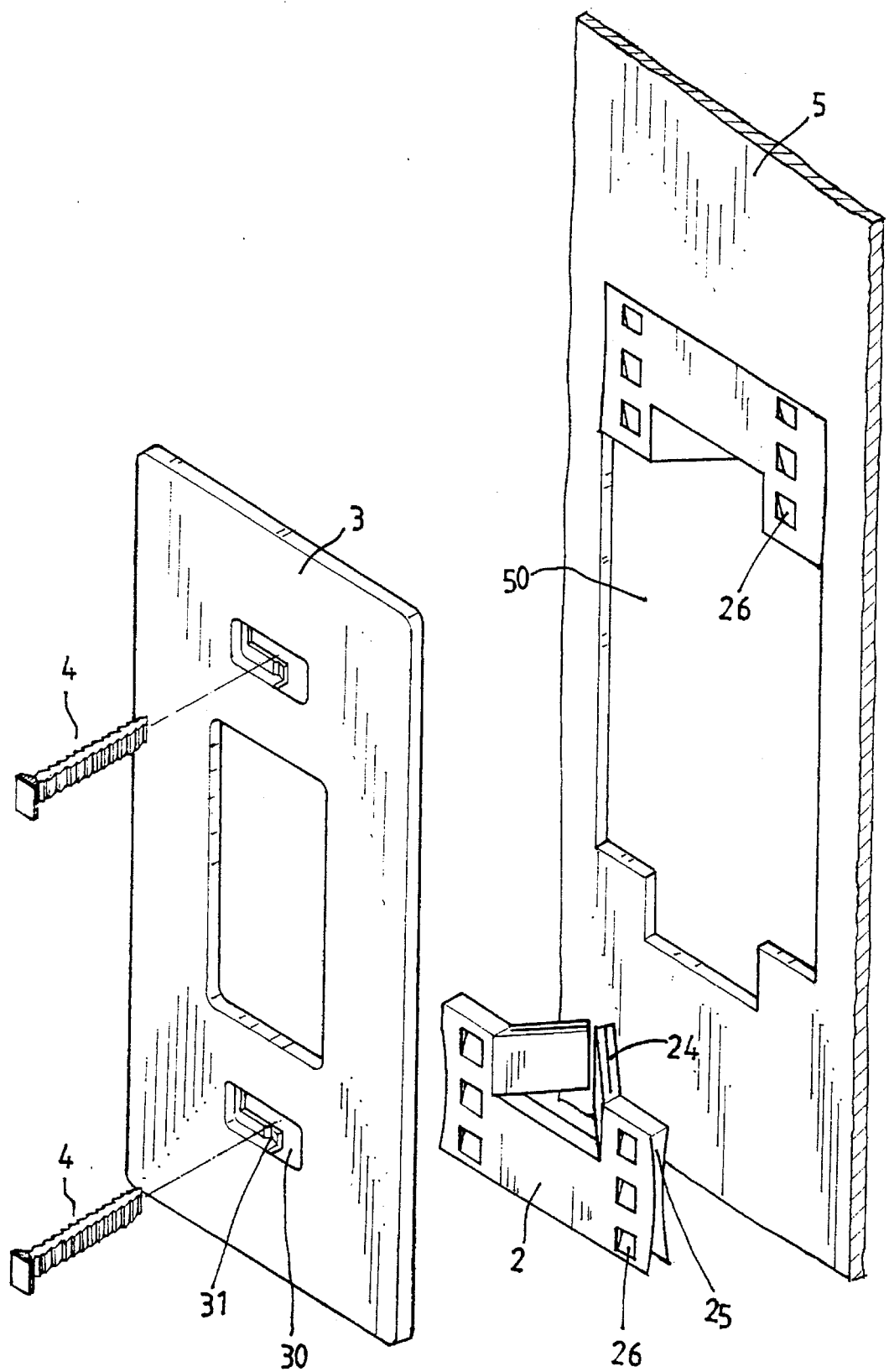
FIG. 5 shows an exploded view of a second preferred embodiment of the present invention.
Figure 6:
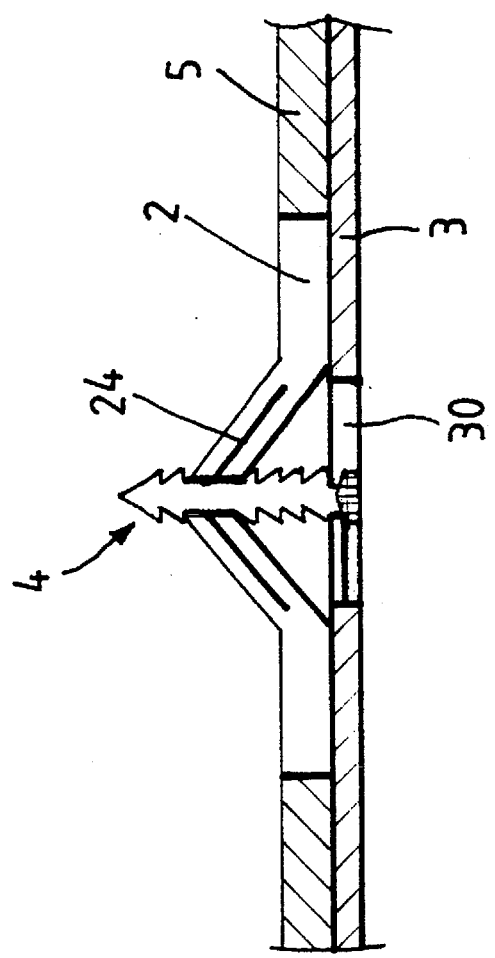
FIG. 6 shows a partial sectional view of the second preferred embodiment in combination according to the present invention.

As shown in FIGS. 5 and 6, the wall switch housing of the present invention can be also fastened with a wooden wall 5 by modifying the resilient piece 2 in such a manner that the resilient piece 2 is provided with a flexible clasp 25 which can be secured to the installation hole 50 of the wooden wall 5. The flexible clasp 25 is provided with a plurality of retaining projections 26 for reinforcing the engagement of the resilient piece 2 with the wooden wall 5. The cover plate 3 of the present invention can be then fastened to the surface of the wooden wall 5 by means of the connection nails 4 which are engaged with the retaining portions 24 of the resilient piece 2 via the retaining holes 31 of the cover plate 3.

The embodiments of the present invention described above are to be regarded in all respects as merely illustrative and not restrictive. Accordingly, the present invention may be embodied in other specific forms without deviating from the spirit thereof. The present invention is therefore to be limited only by the scope of the following appended claims.

What is claimed is:

1. A housing of an electrical switch comprising:

a wiring box provided on an inner wall thereof with a predetermined number of locating projections which are separated by a predetermined interval and are provided respectively in one side thereof with a recess;

a predetermined number of resilient pieces which are provided respectively in a horizontal surface thereof with a predetermined number of locating holes corresponding in location to and engageable with said locating projections of said wiring box, said resilient pieces further provided respectively in a vertical surface thereof with a predetermined number of retaining portions corresponding respectively in location to said interval and communicating with said interval at such time when said locating projections are engaged respectively with said locating holes;

a cover plate provided with a predetermined number of retaining holes which are respectively in communication with said retaining portions of said resilient pieces and said intervals of said wiring box when said cover plate is joined with said wiring box; and a predetermined number of connection nails which are provided respectively with a serrated portion engageable securely with one of said retaining portions of a respective one of said resilient pieces via one of said retaining holes of said cover plate.

2. The housing of an electrical switch as defined in claim 1, wherein said retaining holes of said cover plate are each provided respectively with a V-shaped surface; and wherein said connection nails are each provided respectively with a tapered end engageable with one of said V-shaped surfaces of said retaining holes of said cover plate.

3. The housing of an electrical switch as defined in claim 1, wherein said resilient pieces are each provided respectively with a flexible clasp engageable with a wooden wall and having a plurality of retaining projections for reinforcing the engagement of said flexible clasp with said wooden wall.

* * * * *